Figure 1:
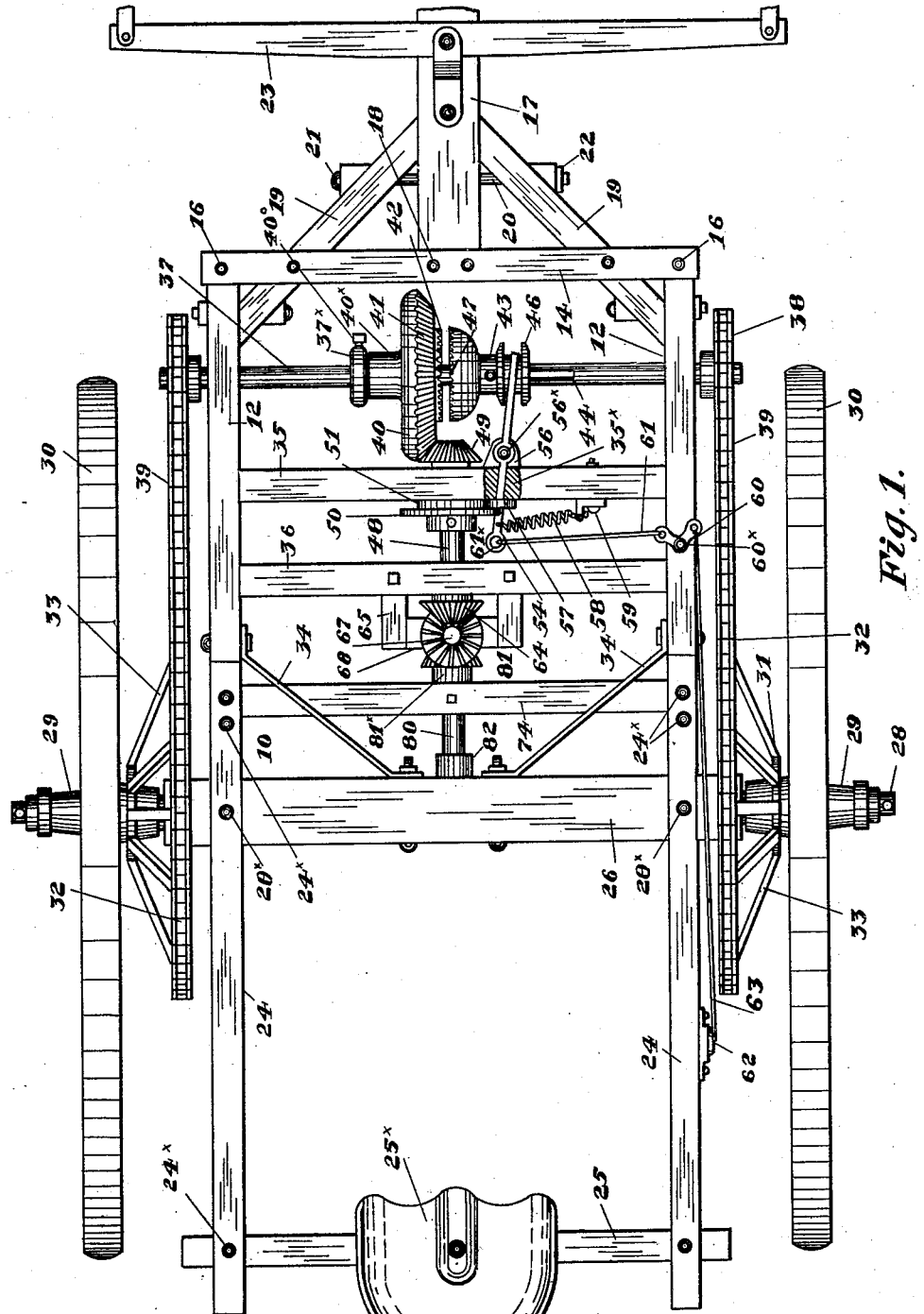

W. D. LINDSLEY.
COTTON CHOPPER.
APPLICATION FILED MAY 5, 1908.

902,500.

Patented Oct. 27, 1908.
3 SHEETS—SHEET 1.

Witnesses
C. L. Bronson,
S. L. C. Hassan

Inventor
William D. Lindsley
By Richd. Manning
Attorney

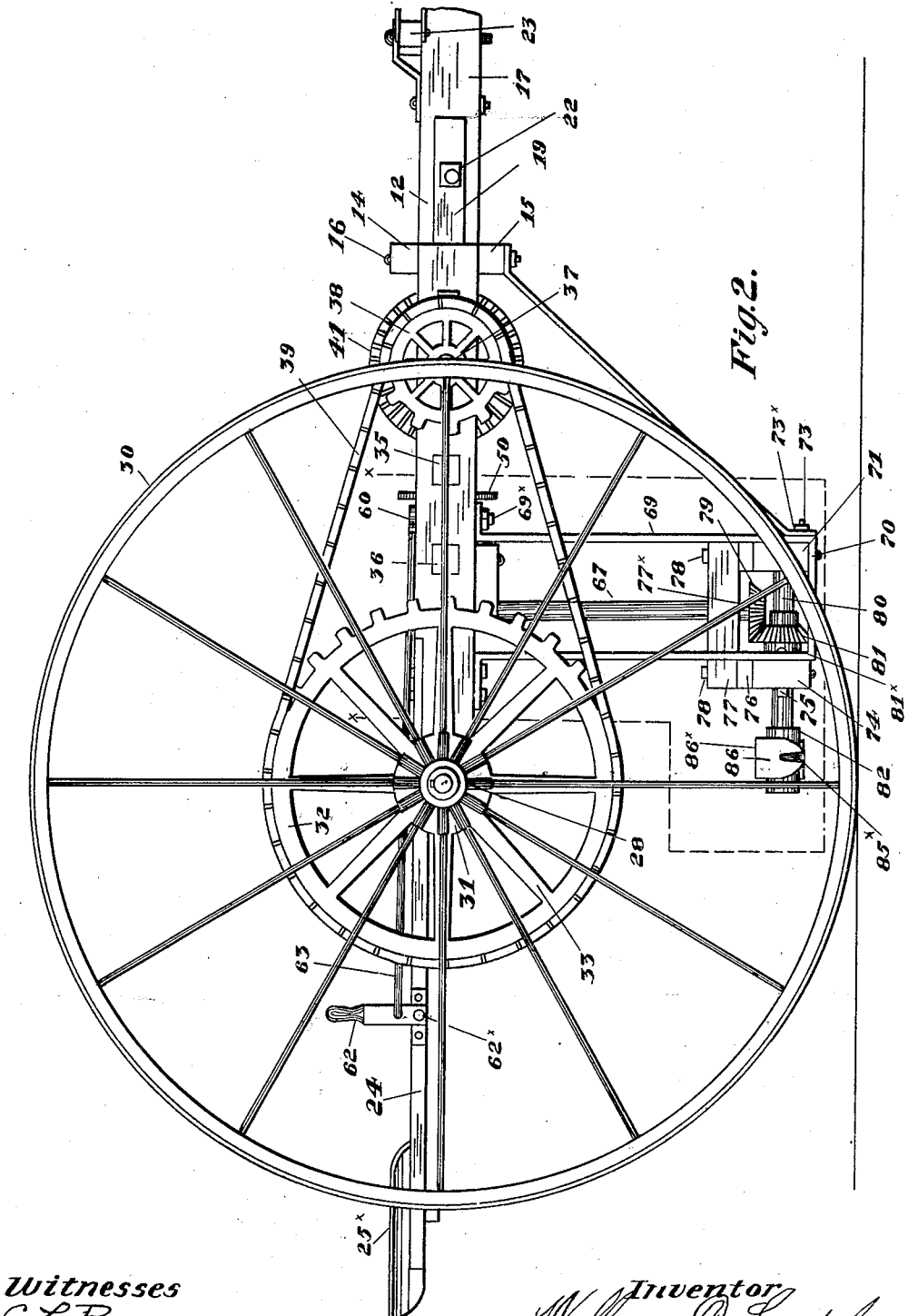

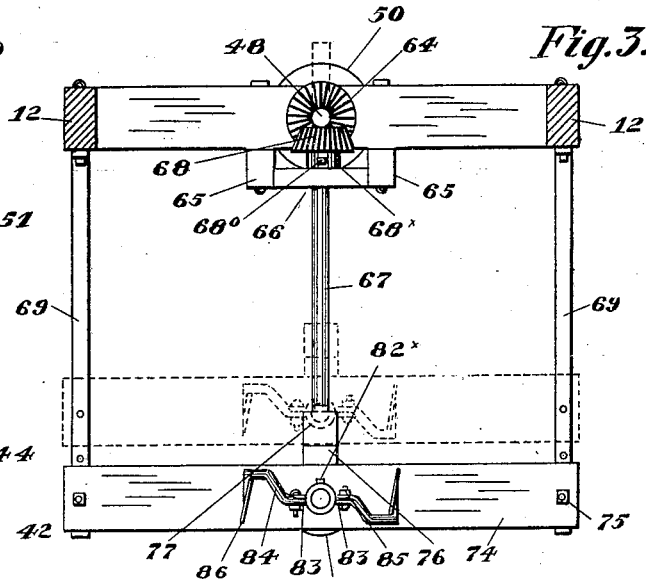

UNITED STATES PATENT OFFICE.

WILLIAM D. LINDSLEY, OF WAYNOKA, OKLAHOMA.

COTTON-CHOPPER.

No. 902,500.  Specification of Letters Patent.  Patented Oct. 27, 1908.

Application filed May 5, 1908. Serial No. 430,970.

*To all whom it may concern:*

Be it known that I, WILLIAM D. LINDSLEY, a citizen of the United States of America, residing at Waynoka, in the county of Woods and State of Oklahoma, have invented certain new and useful Improvements in Cotton-Choppers; and I do hereby declare that the following is a full, clear, and exact description of the invention, such as will enable others to make and use the same, reference being had to the accompanying drawings, forming a part of this specification.

The object of the invention, primarily, is to chop out the plants in the field in either hills or drills, at regular or determinate distances in the direction of the rows, so as to afford room for the growth of the remaining plants. Secondly, mechanism acting to impart rotary movement to the cotton choppers and which may be controlled so as to cut the plants intermittently. Third: means whereby the plants may be removed from hills or ridges at different elevations.

The invention consists in the novel construction and combination of parts, such as will be first fully described and then specifically pointed out in the claims.

In the drawings: Figure 1. is a plan view of the invention. Fig. 2. is a side view of the same. Fig. 3. is a transverse, vertical, sectional view, taken upon the lines $x, x$, on Fig. 2. Fig. 4. is a detail view, in perspective, of the frame of the cotton chopper, taken from the rear end, with the wheels removed, showing the adjustable supporting devices for the cotton choppers in an elevated position. Fig. 5. is a detail, side view of the cam wheel. Fig. 6. is a detail view of the gear wheel and clutch on the main power transmitting shaft.

Similar numerals of reference indicate corresponding parts in all the figures of the drawing.

Referring to the drawings, 10 indicates the main frame supporting the cotton choppers, and the operating mechanism, and which consists of the longitudinal side beams 12, parallel in position and arranged at considerable distances apart. At the forward end of the beams 12, are the transverse connecting beams 14 and 15, the ends of the respective beams being bolted by the bolts 16, to the respective upper and lower surfaces of said beams 12. Between these beams 14 and 15 is extended the rear end of the tongues 17, secured by the bolts 18, to said beams, at a point intermediate the beams 12. Braces 19, are connected with the forward end of beams 12, and extend forwardly between the beams 14 and 15, and are bolted to the opposite sides of the tongue 17. Through the braces 19 and the tongue 17 extends, transversely, the rod 20, upon one end of which is the head 21, the other end being screw threaded, and upon said screw threaded end is a nut 22. The frame 10 is thus braced at its forward end, to withstand any lateral strain to which it may be subjected. Upon the tongue 17 is provided a whiffletree 23.

With the rear ends of beam 12 is rigidly connected the transverse axle beam 26. With the upper surface and rear ends of said beams 12 are connected by the bolts $24^\times$, extending through said beams, the forward ends of the flat bars 24, forming a rear extension of frame 10, the rear ends of which bars extend rearwardly a distance corresponding to the length of beams 12, and with said rear ends is connected, rigidly, the ends of a transverse bar 25, upon which is mounted a seat $25^\times$, for the driver. The ends of the axle beam 26 extend a short distance beyond the line of the outer surfaces of beams 12. In the ends of the beams 26 are longitudinal openings 27, in which are extended the inner ends of short spindles or axles 28, secured therein by bolts $23^\times$, extending through the bars 24, the beam 26, and the perforation $26^\times$, in the axle beam 26. (See Fig. 4). Upon the outer ends of the axles 28 are mounted, rotatively, the hubs 29, of the supporting wheels 30, to the frame 10. Upon the inner portions of the hubs 29 are secured, fixedly, the concentric hubs 31, of large sprocket wheels 32, the spokes 33 extending from the hub are dished in the direction of the frame 10. The axle beam 26 is braced by the brace bars 34, connected with the forward surface of said beam and extending forwardly and connected with the inner surface of the respective beams 12. Intermediate said forward surface of the beam 26 and the rear surfaces of the transverse beams 14 and 15, are located the separate transverse beams 35 and 36, which beams are arranged a short distance apart from each other, and the ends of said beams mortised in the sides of the beams 12. Through the forward portions of the beams 12, intermediate the beam 35 and forward ends of said beams 12 extend, or are journaled, the ends of the main, transverse, power transmitting, rotary shaft 37, the said ends extending a short distance outwardly from the line of the outer surfaces of the beams 12, and upon said ends of shaft 37 are small sprocket wheels 38. Over the sprocket wheels 38, and the large sprocket wheels 32, on the main supporting wheels 30, are extended the endless sprocket chains 39.

Upon the main power shaft 37, intermediate the ends of said shaft, is fixedly secured a combined clutch and gear wheel 40, upon which is a hub $40^\times$, and upon shaft 37 is a collar $37^\times$, held against the hub by the set screw $40°$. The gear teeth 41 are upon the inner face of the wheel, adjacent to the periphery, and are inclined or beveled at an angle to the face of said wheel. Upon the central portion of the face of said wheel are clutch teeth 42. Upon shaft 37, upon the side of wheel 40, having the clutch teeth 42, is a sliding sleeve 43. In shaft 37 is a key-way 44, and upon said sleeve is a key 45, movable on said key-way. Upon the outer end of sleeve 43 is a grooved collar 46. Upon the inner end of the sleeve 43 are outwardly extended clutch teeth 47, extended inwardly in the direction of and adapted to come into contact with the clutch teeth 42, on the gear wheel 40.

Through the beams 35 and 36, in the longitudinal direction of frame 10, and intermediate the ends of said beams extend, or are journaled the ends of a short, power transmitting rotary shaft 48. The forward end of said shaft extends a short distance beyond the line of the forward surface of beam 35, and upon said end is a bevel gear wheel 49, meshing with the gear teeth 41 on the wheel 40, on shaft 37. Upon said rotary shaft 48, adjacent to the rear surface of beam 35, is secured a cam wheel 50. The cam consists of an outwardly extended, annular projection 51, from the face of said wheel in the direction of beam 35, and which projection is located a short distance inwardly from the periphery of said wheel. A portion of said projection is curved inwardly, at 52, forming the cam. In the periphery of the said wheel, upon a line extending radially from shaft 48, and through cam 52, is a notch 53, one side of which notch is curved outwardly at $53^\times$.

54 indicates a clutch operating lever, its forward end being forked at 55, one of said forked ends extending within the grooved collar 46, (see Fig. 4) above the shaft 37, and the other within the collar below said shaft. This lever 54 is fulcrumed upon the forward end of a bracket 56, secured to the forward surface of beams 35, a pivot $56^\times$ extending through said lever and said bracket. The beam 35 is cut away at $35^\times$, (see Fig. 1) in a transverse direction, and through which the rear end of the lever 54 extends and in the direction of the beam 36. Upon the said rear end portion of lever 54 is a small wheel 57, rotatable upon the lever, and which travels upon the outer surface of the lateral, annular projection on the inner side of the cam wheel 50, and the said rear end of the lever 54 is adapted to enter the notch 53, as further described. An expansion spring 58 is connected at one end with the said rear end of lever 54, and the other end with the bracket 59, on the rear surface of the beam 35, the said spring being normally expanded and acting to move the rear end of the lever 54, within the said notch 53, in the periphery of cam wheel 50. Upon the upper surface of the side beam 12, upon the right hand side of the main frame between the lines of the ends of the beams 35 and 36, is pivoted at $60^\times$, the bell crank lever 60. With one arm of the bell crank lever is connected, pivotally, one end of a connecting rod 61, the other end of which rod is pivotally connected, with the rear end of the lever 54. Upon the outer surface of beam 12, upon which is located the bell crank lever 60, at a point forward of the rear, transverse beam 24, is pivotally connected, at $62^\times$, the lower end of an operating lever 62, the upper end of which lever is extended upwardly, within reach of the hand of the driver on seat $25^\times$. With the side of lever 62, at a point a short distance above its pivotal point $62^\times$, is pivotally connected the rear end of a connecting rod 63, the forward end of which rod is pivotally connected with the other arm of the bell crank lever to that connected with the rod 61.

Upon the rear end of shaft 48, which extends through the beam 36, and a short distance beyond the line of the rear surface of said beam, is a bevel gear wheel 64. Bolted at their rear ends to the beam 36, and extending toward the axle beam 26, from the lower surface of said beam and upon each side of a vertical line extending through the bevel gear wheel 64, are cleats 65, with the rear ends of which cleats are connected a transverse shaft support or plate 66. Through this plate 66 extends the upper end of an upright, rotary shaft 67, and upon which end is a sliding bevel gear 68, meshing with the bevel gear wheel 64. Upon the under side of the bevel gear wheel 68 is an annular collar $68^\times$, which bears upon the upper surface of the plate 66. Through the collar $68^\times$ extends an adjusting set screw $68°$, (see Fig. 3) which binds upon the shaft 67. Upon releasing the screw the shaft may be extended through the gear 68, upwardly, the proper height above the gear wheel.

For supporting the cotton choppers, and adjusting them in position, suspensory frames 69 are secured, rigidly, to the under side of beams 12, immediately forward of the axle beam 26. These frames consist of two vertical, forward and rear bars, bent at right angles at their upper ends, in opposite directions, and secured by the bolts 69×, to the respective side beams 12, the forward bars being secured to said beams, at a point nearly in a vertical line with the forward surfaces of the ends of the transverse beam 36, and the rear bars at a point intermediate the ends of said beam and the axle beam 26. The lower ends of these bars extend downwardly to within a short distance of the ground, and with said ends are connected the transverse bars 70. With the forward, depending bars of frame 69, upon the side beams 12, are connected, adjustably, the transverse beam 71. In the said forward, vertical bars of the frame 69, are transverse perforations 72, in vertical series and at proper distances apart from each other, in said series. Through the ends of beams 71 and the perforations 72, extend the adjusting bolts 73, upon which are the nuts 73×, (see Fig. 2.) With the rear, vertical bars of frame 69, and with the rear, outer surfaces are connected, adjustably, the ends of a transverse beam 74, the upper surfaces of which beam are upon the same horizontal plane with the upper surfaces of the beam 71. The vertical supporting bars are provided with perforations, in vertical series, as described of the forward bars, and adjusting bolts and nuts 75, which are the same as the adjusting bolts 73, and said beam 74 being vertically adjustable at the same height as beam 71. At a point intermediate the ends of the transverse beams 71 and 74, and upon the upper surfaces of said beams, are blocks 76. Upon these blocks are mounted the ends of a shaft supporting block 77, and which are secured to the respective beams 71 and 74 by the nut bolts 78, extending through the blocks 76 and through the beams 71 and 74. Through a suitable perforation 77×, in the block 77, extends the lower end of the vertical shaft 67, and upon the said end upon the lower side of the block 77, is secured a bevel gear wheel 79. Directly beneath the shaft 67, and extending horizontally in the longitudinal direction of the frame 10, and through the beams 71 and 74, and journaled in said beams is a rotary shaft 80, upon which shaft is secured a bevel gear wheel 81, which meshes with the bevel gear wheel 79, on the vertical shaft 67. Upon the bevel gear 81 is a collar 81×, which bears against the forward surface of the beams 74, keeping the gear on both sides in mesh. The rear end of shaft 80 extends a considerable distance in rear of the line of the rear surface of the beam 74, and upon said end is a detachable sleeve 82, secured to said shaft by means of a set screw 82×. (See Fig. 1.)

Extending outwardly in opposite directions from the outer surfaces of sleeves 82 are lugs 83, circular in cross section.

84 indicates the detachable arms carrying the cotton choppers. The inner portions of these arms are grooved, and extend upon the respective upper and lower surfaces of the lugs 83, and through said lugs and arms extend the securing bolts 85. From the outer ends of the lugs 83 the respective arms 84 are bent and inclined, at an angle to said lugs, and extended in opposite directions, the requisite distance, thence extended horizontally in a straight line, a short distance. Upon the said outer ends of the arms 84 are the respective upwardly and downwardly extended V-shaped braces 85, to which are secured the cotton chopping plates 86. These plates are located directly beneath the axle 26, and nearly flat, and made of the proper width, with curved upper ends, the plates 86 having their cutting edges 86×, extending, respectively, in opposite directions, the said arms 84 being secured to the lugs 83, so as to incline the cutting edges forwardly and upwardly, in a slight degree, thus permitting the chopping plates 86 to enter the soil, and withdraw therefrom with the least resistance.

In operation the transverse supporting beams 71 and 74, to the rotary shaft 80, carrying the cotton choppers, are positioned for general purposes where the ground is free from ridges, in the lower position of the suspensory frame 69, thus permitting the cotton chopper plates 86 to enter the ground at the proper depth. The position of the lever 54, operating the sleeve 43, on the main shaft 37, is within the notch 53, of the cam wheel 50, the small wheel 57, bearing upon the cam surface 52, of the annular plate 51, in which position of the lever 54, the portion 47, of the positive clutch is out of engagement with the clutch teeth 42, on the cam wheel 50. The wheels 30, supporting the frame 10, are positioned between the alined rows of the cotton plants, so that shaft 80, operating the cotton choppers, is directly above the plants in one of said rows.

The power ordinarily employed to move the frame 10 is from a team of horses, hitched to the whiffletree 23, and the drawing power is transmitted to the wheels 30, and through the sprocket wheels 32, on said wheels, to the sprocket chain 39, through said chain to the small sprocket wheels 38, and to the main power transmitting shaft 37.

In the forward movement of the frame 10, and at the starting of the row, the driver from his position on the seat 25, grasps the lever 62 by the hand and draws its upper end rearwardly, which movement is communicated to the connecting rods 58, through the bell crank lever 60, and the rear end of the lever 54 is drawn out of the notch 53, of the cam wheel 50, compressing the spring 58, and the wheel is moved out of the cam wheel upon the outer surface of the annular plate 51. This movement of the lever 54 moves the sleeve 43, in the main driving shaft 37, toward the gear wheel 40, and causes the clutch teeth 47, on said sleeve, to engage positively with the clutch teeth 42, on said gear wheel. The driver then releases his grip upon the lever 62. The advanced movement of the frame 10 now communicates power direct from the shaft 37, to the gear wheel 40, thence to the bevel gear wheel, 49, and shaft 48, carrying the cam wheel 50, and these wheels make a full rotation, the power being simultaneously transmitted through the bevel gear wheels 64 and 68 to the vertical shaft 67, thence through the bevel gear wheels 79 and 81, at the lower end of the shaft to the horizontal shaft 80, carrying the cotton chopping plates 86, and one full rotation is imparted to the said shaft. In this rotation one of the choppers 86, upon one arm 84, on the shaft 80, cuts out the plants to the extent of about six inches, and as the frame 10 advances with the drawing of the team, another plant is chopped out, of about six inches, upon the contact of the latter chopper with the ground, thus leaving the space between the plants, about twelve inches. Upon the completion of the rotation of the shaft 80, the cam wheel 50 has made a full rotation, and the notch 53 comes opposite in position to the rear end of the lever 48, in which position of the cam wheel the lever enters the notch 53, of cam 50, automatically controlling the further movement of shaft 48 and where the mechanism is locked, and the clutch teeth 47 are simultaneously disengaged from the gear wheel 40, and the shaft 48 ceases to rotate. Having chopped out the space of twelve inches, if it is desirable to leave the first standing plant, then cut out between the plants twelve inches more, the driver again operates the lever 62, which releases the cam wheel 50 and causes the clutch teeth 42 and 47, on the gear wheel 40 and sleeve, respectively, to engage with each other, and the chopper rotates on shaft 80, cutting out twelve inches more of the plants, and this action is repeated to the end of the row. It is customary to leave the plants fourteen or fifteen inches apart, and when a greater distance is required cotton choppers of an increased width are employed. The wheel 57, on the lever 54, is acted upon by the cam 52 to facilitate the unlocking of the lever from the notch in the cam wheel 50; and also co-acts with the annular projection 51 to keep the lever out of contact with the wheel during an interval of time in which the power from the main shaft 37 is communicated to the shaft 80, carrying the cotton choppers, and in which time the wheel 50 makes one rotation and the shaft 80 also makes one rotation.

It will be obvious that the cotton choppers 86 are located directly beneath the axle 26, the object being to secure uniform depth of the choppers in the ground, which could not be secured at any point forward or in rear of this position.

In order to chop out the plants which are in hills or ridges, the transverse beams carrying the shaft 80 are adjusted in position the height desired, above the transverse plate 70, as seen in Fig. 1, into an adjusted position, as seen in Fig. 4, in which adjustment the set screw 68°, or the hub of the bevel gear wheel 68, is loosened, and the vertical shaft 67 moves upwardly within the gear wheel the height relative to the adjustment of the beams 71 and 74.

The capability to remove the plants desired, and at the desired intervals is accomplished thoroughly and economically, in the invention, it being observed, that in the intermittent action of the choppers, the degree of motion transmitted to the choppers through the shafts 67 and 80 is equal during the application of power.

Having fully described my invention, what I now claim as new and desire to secure by Letters Patent is:

1. In a rotary cotton chopper, the combination with the main frame and the supporting wheels, and with suspensory devices upon said frame, of a rotary shaft upon said suspensory devices, and cotton chopping devices on said shaft, a main driving shaft on said frame, and power transmitting devices actuated by said shaft and transmitting power to the rotary shaft carrying the cotton chopping devices, and locking mechanism on said frame controlling the movement of said latter shaft.

2. In a rotary cotton chopper, the combination with the main frame and supporting wheels, and the main power transmitting, rotary shaft upon said frame, and with the horizontal rotary shaft beneath said frame, of cotton choppers on said shaft and a clutch member connecting the said latter shaft with the main power shaft a clutch operating lever, and locking mechanism for said lever.

3. In a rotary cotton chopper, the combination with the main frame and supporting wheels, the main power transmitting, rotary shaft on said frame, power transmitting devices on said wheels connected with said shaft, a horizontal rotary shaft beneath said frame, and suspensory devices on said frame therefor, cotton chopping devices on said horizontal shaft, a vertical power shaft and power transmitting devices on said horizontal and vertical shafts connected with each other, and power transmitting devices upon the main power shaft connected with said vertical shaft, and a clutch member connecting the said power transmitting devices with the main shaft and mechanism controlling the disengagement of the clutch member automatically.

4. In a rotary cotton chopper, the combination with the main frame and supporting wheels, and with the main, power transmitting, rotary shaft actuated by said wheels, a rotary shaft beneath said frame, suspensory devices on said frame therefor, cotton choppers on said latter shaft, and a combined power transmitting wheel and clutch on said main shaft, a sliding portion of said clutch keyed on said shaft, and a lever adapted to operate said sliding portion of said clutch, a separate power shaft on said frame, and power transmitting devices thereon, transmitting power from said combined wheel and clutch to the rotary shaft carrying the cotton choppers, and a cam wheel adapted to impart motion to said clutch operating lever.

5. In a cotton chopper, a main frame and supporting wheels, and a main, power transmitting shaft, a frame connected with and depending from the main frame, and adjustable shaft supports thereon, and a rotary shaft mounted in said supports, and cotton chopping devices on said shaft, and a separate, power transmitting shaft, and an adjustable, sliding gear wheel on said latter shaft, communicating power from the main power shaft to the rotary shaft carrying said cotton chopping devices.

6. In a cotton chopper, the combination with the main frame and the supporting wheels, and a main power transmitting, rotary shaft on said frame, and the cotton chopping devices, of a combined gear wheel and clutch on said shaft, and a sliding portion of said clutch keyed on said shaft, a power transmitting shaft adapted to transmit power to the cotton chopping devices, and a cam wheel on said rotary shaft, and a lever fulcrumed on said frame, controlling the movement of the sliding portion of said sleeve and itself controlled intermittently by said cam wheel.

7. A mechanism for cotton choppers, comprising a main, power transmitting rotary shaft, a combined gear wheel and clutch on said shaft, and a sliding portion of said clutch keyed on said shaft, a lever, and a suitable fulcrum therefor, adapted to move said sliding portion of the clutch in and out of engagement with the clutch teeth on the gear wheel, a separate power transmitting shaft, and gear on said shaft actuated by the said combined gear wheel and clutch, a wheel having a notch on the latter shaft, and resilient means acting to move said lever within the said notch.

8. A mechanism for cotton choppers, comprising a main, power transmitting shaft, a combined gear wheel and clutch on said shaft, and a sliding portion of said clutch keyed on said shaft, a lever having a suitable fulcrum adapted to move said sliding portion of the clutch in and out of engagement with the clutch teeth on the gear wheel, a separate power transmitting shaft, and gear on said shaft, actuated by the gear on said combined gear wheel and clutch, a wheel having a notch mounted on said separate shaft, and a cam on said wheel, and a loose wheel on said lever, adapted to come into contact with said cam, and controlling means for controlling the movements of said lever within the notch in the said cam wheel.

9. In a cotton chopper, the combination with the main frame, the supporting wheels, and with the main power transmitting, rotary shaft, on said frame, of a combined gear wheel and clutch on said shaft, and a sliding portion of said clutch keyed on said shaft, a lever fulcrumed on said frame, and adapted to move the said sliding portion of the clutch in and out of engagement with the said gear wheel, cotton chopping devices supported by said frame, and a separate, power transmitting, rotary shaft, in said frame, actuating said devices, and power transmitting devices on said latter shaft, engaging with the said combined gear wheel and clutch, on the main power transmitting, rotary shaft, and a wheel on said shaft, actuating the chopping devices, having a notch and a cam on said wheel, and devices on said lever actuated by said cam, and a spring connected with said lever and the said frame.

10. In a cotton chopper, the combination with the main frame and the supporting wheels, the main power transmitting, rotary shaft actuated by the said wheels, of a combined gear wheel and clutch on said shaft, and a sliding portion of said clutch keyed on said shaft, a lever fulcrumed on said frame, adapted to move said sliding portion of the clutch in and out of engagement with the clutch teeth on the gear wheel, cotton chopping devices supported by said main frame, and a rotary shaft actuating said devices, and a gear wheel on said shaft, engaging with the gear wheel on said main power shaft, and a wheel on said shaft actuating the plant chopping devices, having a notch in its periphery, and a cam on said wheel, and a wheel on said lever, adapted to come into contact with said cam, and a spring on said frame, connected with and adapted to move said lever within the notch on said wheel.

11.. In a rotary cotton chopper, the combination with the main frame and the supporting wheels, of sprocket wheels mounted on said supporting wheels, a main power transmitting shaft on said frame, sprocket wheels on said shaft, and sprocket chains upon said wheels on said shaft, and supporting wheels to said frame, suspensory devices connected with said frame, and shaft supporting devices within said suspensory devices, and a horizontal rotary shaft, mounted on said shaft supporting devices, an upright, power transmitting, rotary shaft, journaled on said frame, actuating the shaft carrying the cotton chopping devices, a horizontal, rotary shaft upon said frame, and power transmitting devices on said shaft, communicating power to said upright rotary shaft, clutch mechanism communicating power from the main power transmitting shaft to said horizontal power shaft, on said frame, a clutch operating lever and controlling means on said latter shaft controlling said lever.

12. In a rotary cotton chopper, the combination with the main frame, and the supporting wheels, a main power transmitting shaft upon said frame, actuated by the said frame supporting wheels, rotary cotton choppers supported by said frame, a separate shaft mounted upon said frame, and a wheel upon said shaft, having a notch in its periphery, a combined gear wheel and clutch on said main power transmitting shaft, and a sliding portion of said clutch keyed on said shaft, a bevel gear on the separate shaft carrying said notched wheel, engaging the combined gear wheel and clutch, a lever fulcrumed on said main frame, having one end adapted to move the sliding portion of the said clutch in and out of engagement with the clutch teeth on said combined gear wheel and clutch, a spring on said frame bearing upon the other arm of the lever, a bell crank lever on the main frame, and a pivoted lever on the side of said frame, and connecting rods pivotally connected with one arm of said bell crank lever, and also with the other arm of said bell crank lever and with the said pivoted operating lever on said frame.

WILLIAM D. LINDSLEY.

Witnesses:
 CLARENCE E. HILTON,
 CURVIN D. WILLARD.